July 19, 1932.  W. J. HOFFMAN  1,867,624
DEVICE FOR OBTAINING BIOPSY SPECIMENS
Filed April 1, 1930   2 Sheets-Sheet 1

INVENTOR
William Joseph Hoffman
BY
ATTORNEY

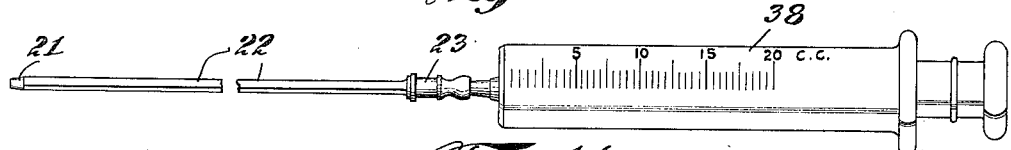
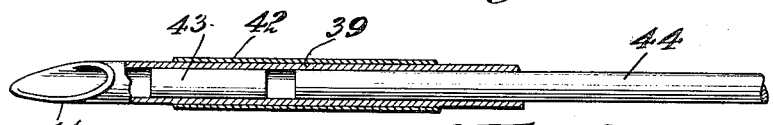
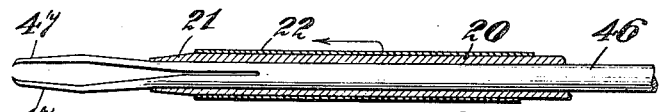
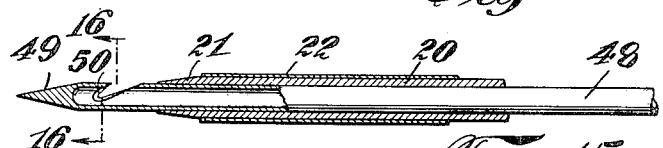
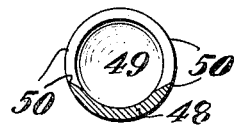
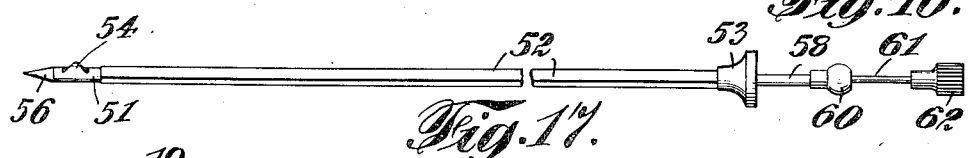
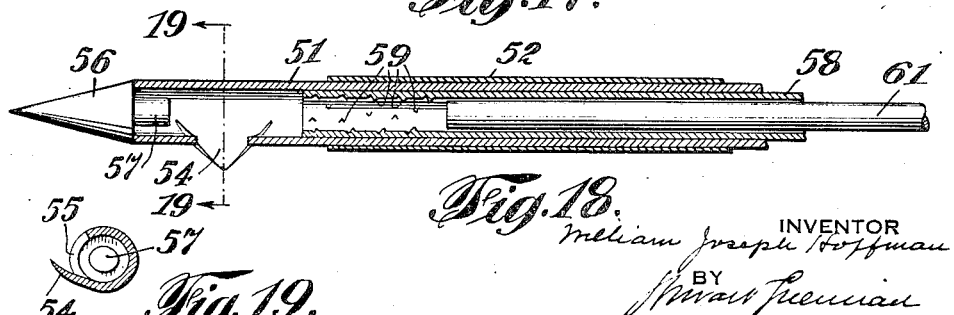

Patented July 19, 1932

1,867,624

UNITED STATES PATENT OFFICE

WILLIAM JOSEPH HOFFMAN, OF NEW YORK, N. Y., ASSIGNOR TO MEMORIAL HOSPITAL FOR THE TREATMENT OF CANCER AND ALLIED DISEASES, OF NEW YORK, N. Y., A CORPORATION OF NEW YORK

DEVICE FOR OBTAINING BIOPSY SPECIMENS

Application filed April 1, 1930. Serial No. 440,725.

My invention relates to processes for obtaining biopsy specimens and devices adapted for the same.

As the processes and devices of my invention are particularly adapted for obtaining biopsy specimens of tumors, I describe them in their application to these particular growths, but I do not limit myself to such use as it is evident they are applicable also to the obtaining of other sub-cutaneous specimens.

In the clinical diagnosis of tumors, the final decision as to the nature of the growth often can be determined only when a piece of the tumor, or a part of its contents, is obtained for pathological examination. Many questions can be definitely settled when biopsy material is once obtained in sufficient amount, and in comparatively unchanged condition. Some of these are:—Whether the tumor is inflammatory, benign or malignant; the type of the tumor; grade of malignancy and radiosensitivity. Based on this information, further deductions may be made relative to the prognosis, and to the treatment of choice. Knowing these facts, one can decide whether surgery or radiation alone, or a combination of both, would offer most for the patient.

The present methods of obtaining a biopsy include:

1. Excision, (a) scalpel, (b) cautery, (c) endotherm knife.
2. Aspiration.
3. Various punch methods, making use of cylindrical punches, barbed hooks, "harpoons", punch forceps, gouges, dental broach.

The disadvantages of each of these methods may be briefly mentioned as follows:—

Excision by scalpel affords a method of obtaining a specimen readily enough, but has the serious disadvantage that it creates a relatively huge breach in the capsule of the tumor, and prepares a route along which a cancer may rapidly spread. Recurrences of cancer in surgical incisions amply demonstrate this fact. A further disadvantage is that a real incision of greater or less extent is necessary. Not only does this mean a surgical exposure under aseptic conditions, with a more or less elaborate set-up in the operating room, but as attendant results we have suture of the wound, a sequence of surgical dressings, and a greater cosmetic blemish by reason of the larger scar.

Excision by actual cautery or by endotherm knife is relatively much safer than excision by scalpel. Properly used, these instruments so devitalize the tissues of the tumor and its bed, that implantation of tumor cells and recurrence along the incision is reduced to a minimum. These methods, however, are open to the same objection as excision by scalpel, in that they are part of an elaborate procedure, require an operating room set-up, a comparatively large incision, with after care and result in a definite scar at line of incision.

Aspiration of a tumor by means of a syringe and hollow needle is simple, easy, and the equipment is readily available. It is an office procedure. It works best in fluid or semi-fluid tumors, fairly well in soft, highly cellular tumors, and poorest in those of denser structure. The passage of a #18 gauge needle into a tumor inflicts a minimum of trauma, but in actual practice it fails so many times on the initial attempt, that the usual technique requires that the needle be pushed into the mass repeatedly, causing the detachment of cells, and bleeding into the tumor. By exerting suction on the syringe, an attempt is made to draw out some of this blood with the contained tumor cells. The method has a low percentage of success, and in the end it entails a fair amount of trauma to the tumor by reason of multiple punctures. The most serious objection is that withdrawal of the needle, contaminated as it is by tumor cells on its surface, implants them along the needle track.

Various punch methods have been devised. These instruments vary more or less in construction, but depend upon a barbed hook, harpoon, cylindrical punch or gouge, to cut off or tear away a piece of tumor tissue. These are positive in action, require no incision, have a high percentage of success in obtaining tissue, but are all open to the great objection common to the aspiration method and excision by scalpel,—that they draw living tumor tissue out through a breach in the tumor wall, and implant it along the track.

An ideal method of biopsy should satisfy the following requirements:—It should be safe, should not favor the spread of the tumor, should be simple, and should obtain a piece of tissue through a small puncture wound on the first attempt in nearly all cases, inflicting the minimum of trauma.

If a failure occurs, it should be possible to repeat the attempt to obtain a piece of tissue without making a new opening in the capsule of the tumor.

Since all instruments which attempt to remove a piece of tissue must necessarily make a breach in the defensive wall about a tumor, the method must provide some way of sealing that breach and of killing all tumor tissue adherent to the surface of the instrument or leaking out around it or in any manner deposited along the track, before ever the instrument is withdrawn.

It should be simple and sturdy in construction, easy to adjust, to assemble, to clean off all tumor tissue, and to sterilize.

It should be applicable for withdrawal of a wide variety of material whether fluid, semi-fluid, caseous, soft cellular material, densely fibrous or cartilaginous or bony in character.

It should obtain a piece of tissue, (not just a few cells), large enough to furnish material for both an immediate frozen section and for a later paraffin section.

The instrument and technique of my invention meets these requirements.

In the accompanying drawings illustrating modified forms of devices adapted for use in the following of my process, similar parts are designated by similar numerals.

Figure 10 is an enlarged fragmentary longitudinal section of the device of Figures 1 and 7.

Figure 11 is a plan view of the device of Figure 1 connected to a syringe.

Figure 12 is a plan view of a modified form of sheath with an inserted stylet.

Figure 13 is a section through the line 13—13 of Figure 12.

Figure 14 is a fragmentary longitudinal section of a sheath with a modified form of shearing device.

Figure 15 is a fragmentary longitudinal section of a sheath with a modified form of shearing device.

Figure 16 is a section through the line 16—16 of Figure 15.

Figure 17 is a plan view of a modified form of piercing device and removal device.

Figure 18 is an enlarged fragmentary longitudinal section of Figure 17.

Figure 19 is a section through the line 19—19 of Figure 18.

Figure 1:
Figure 1 is a plan view of one form of a sheath of my invention.

The sheath shown in all of the figures except Figures 13, 17, 18 and 19 consists of a hollow cylindrical tube 20 one end of which terminates in the hollow truncated conical member 21. The cylindrical portion of the sheath is covered with an electric non-conducting material 22. A finger-grip 23 is fixedly attached to the other end of the sheath.

The piercing member consists of an annular rod 24, capable of insertion within the longitudinal opening of the sheath, has a pointed end 25 and a finger-grip 26. The finger-grip has an annular recess 27.

Figure 3:
Figure 3 is a plan view of one form of a shearing device of my invention.
Figure 5:
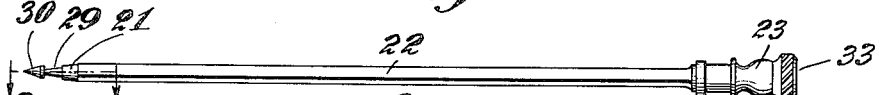
Figure 5 is a plan view of the devices of Figures 1 and 3 in assembled position.
Figure 9:
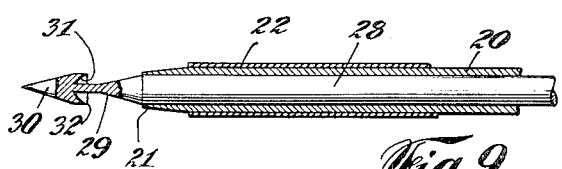
Figure 9 is an enlarged section through the line 9—9 of Figure 5.

The shearing member shown in Figures 3, 5 and 9 consists of a rod 28, one end portion 29 of which is constricted and carries an annular pointed head 30 having the recess 31 with a sharp edge 32. The other end of the rod 28 carries the finger-grip 33.

Figure 2:
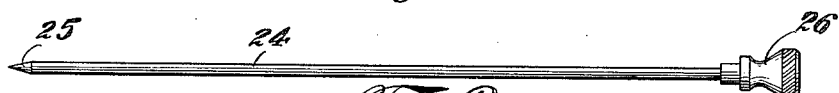
Figure 2 is a plan view of a piercing device of my invention.

The method employed in using the devices shown in Figures 1, 2 and 3 is as follows:—

Figure 4:
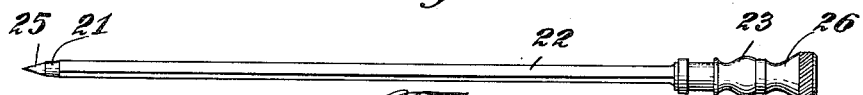
Figure 4 is a plan view of the devices of Figures 1 and 2 in assembled position.

The piercing member is placed within the sheath as shown in Figure 4, and forced through the flesh into the tumor to the required depth. The piercing member is then withdrawn, leaving the sheath inserted. The shearing member is then passed through the sheath as shown in Figure 5. The shearing member is then withdrawn, the sharp edge 31 cutting through the tumor, the removed portion being positioned around the shank 29 and within the recess 31 and hence withdrawn for purposes of testing, the sheath remaining in position during the step of withdrawal. If a satisfactory sample is not obtained, the piercing member may be inserted in the sheath, the two forced further into the tumor, the piercing member withdrawn and the shearing operation repeated. It is to be noted that the puncture is extremely small and that a new puncture is not necessary if a second sample is desired. It is to be further noted that the tumor sample does not come into contact with the puncture duct while being withdrawn and hence all danger of contamination is avoided. It is evident that if the sheath be now withdrawn adhering particle of tumor tissue will contact with healthy tissues in the duct and hence be implanted therein and one of the important elements of my invention is to avoid this possibility of tumor spread which I accomplish as follows:—

Figure 6:
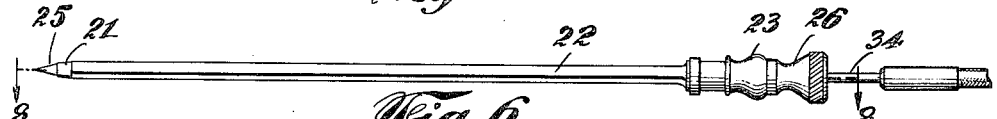
Figure 6 is a plan view of the devices of Figures 1 and 2 assembled and connected with a source of electric current.
Figure 8:
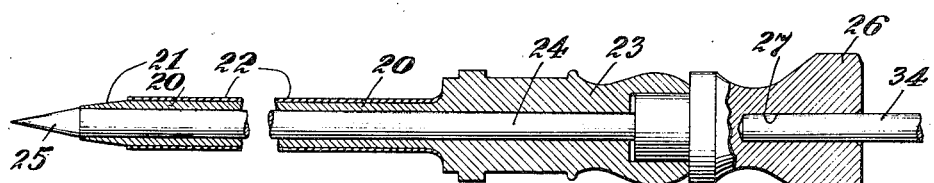
Figure 8 is an enlarged section through the line 8—8 of Figure 6.

While the sheath is in position, I insert the piercing member within the sheath in the position shown in Figures 6 and 8 and insert the electric wire 34 into the recess 27 of the finger-grip 26, the wire 34 being connected to the active pole of high frequency, or diathermy, current. The assembled elements are then slowly withdrawn, the passage of the high frequency current coagulating the adjacent tissues to a depth dependent upon the time taken to exert the effect and the capacity and setting of the high frequency current.

Figure 7:
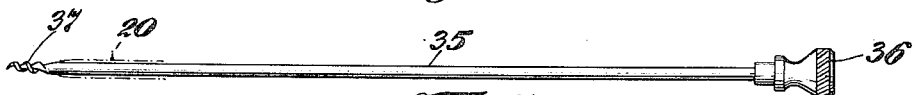
Figure 7 is a plan view of a modified form of shearing device.

The modified form of shearing member shown in Figure 7 consists of a rod 35, having the finger-grip 36 and the spiral cutting end 37, which when revolved cuts out a portion of the tissue which collects in the spiral and can be withdrawn through the sheath, the operation of withdrawal of the sheath being similar to that previously described.

In the modification shown in Figure 11, the inserted sheath is connected to the syringe 38 for purposes of withdrawing tissue by suction means. The sheath is withdrawn as previously described.

The modified form shown in Figures 12 and 13 is intended for inserting a capsule containing radium or radium eminations into the tumor. This device consists of a tube 39 having the finger-grip 40 and the bevelled end 41. The tube 39 is covered with the electric non-conducting material 42. In use a capsule 43 containing radium or radium emanations is placed within the tube, the tube forced into the tumor, the rod 44 having the finger-grip 45 is moved inwardly forcing the capsule into the tissue, a high frequency current passed into the rod 44, which then extends beyond the end of the tube 39 and the assembled members withdrawn.

The modified form of shearing member shown in Figure 14 consists of a rod 46, one end of which is split and bent to form the resilient sharp edged jaws 47, 47. In operation the sheath 20 is forced into the tumor as previously described, and the rod 46 pushed into the tumor beyond the end of the sheath. The resiliency of the metal causes the jaws 47, 47 to open allowing some of the tissue to be placed between them. The sheath is now forced inwardly, causing the jaws to come together and shear off a portion of the tissue which is then withdrawn and the sheath is withdrawn as previously described.

The modified form of shearing device shown in Figures 15 and 16 consist of a tube 48 having a pointed solid end 49, a portion of the tube being cut away to form the sharp edged hook 50. In operating the hook as it is being withdrawn cuts off a portion of tissue which passes into the tube. The sheath is withdrawn as previously described.

The modified form of the device of my invention shown in Figures 17, 18 and 19 consists of a hollow cylindrical sheath 51 having insulation 52 and the finger-grip 53. A cut-out portion 54 of the tube 52 is turned outwardly to form a cutting edge leaving an opening 55. The end of the tube 51 carries the solid pointed end 56 which has an inwardly extended plug 57. A removal member consists of the tube 58 having a plurality of inwardly extended cut-out members 59, 59 and a finger-grip 60. An ejector consists of the rod 61 having the finger-grip 62. The operation of the device is as follows:—

The tube 51 is inserted and given a twisting movement causing the sharp edges of the cut-out 54 to cut off a portion of tissue, a considerable quantity of which will enter the tube through the opening 55. The removal member is then moved inwardly within the tube 51, the plug 57 forcing the tissue into the removal member. The removal member is then withdrawn, the projections 59, 59 retaining the tissue within the removal member. By passing the ejector rod 61 through the removal member, the tissue will be forced from the latter for purposes of examination. The tube, or sheath 51 can then be withdrawn in the manner previously described.

From the foregoing it will be noted that the process of my invention comprising forcing a hollow sheath into the tissue which it is desired to test, cutting away a portion of said tissue, removing said tisue without contact with the incision duct and preventing the contamination of the duct tissues with tumor tissues during the withdrawal of the sheath, and it will be further noted that the devices of my invention consist of a hollow sheath, a piercing member, a shearing member, means for withdrawing the sheared tissue without contact with the duct tissues and means for subjecting the device to a high frequency current of electricity during the withdrawal of the sheath.

The value and advantages of my process and devices have been set forth in my specification.

I do not limit myself to the steps of process, or to the number, size, shape or arrangement of parts particularly shown and described as these are given simply as a means for clearly explaining my invention.

What I claim is:—

1. A device adapted for obtaining specimens of sub-cutaneous tissues comprising a non-slotted tube having a cutting edge and a cutting rod capable of longitudinal movement within and removable from said tube, said cutting rod having an extended conical head capable of extension beyond the extremity of said tube and capable of longitudinal movement within said tube, the base of said head being recessed to form a peripheral cutting edge co-operating with the cutting edge of said tube during the longitudinal movement of the cutting rod to produce a shearing effect.

2. A device adapted for obtaining specimens of sub-cutaneous tissues comprising a non-slotted tube having a cutting edge, a pointed piercing member capable of longitudinal movement within and removable from said tube, the pointed end of said piercing member being extendible beyond the end of said tube, and a cutting rod capable of longitudinal movement within and removable from said tube, said cutting rod having an extended conical head capable of extension beyond the extremity of said tube and capable of longitudinal movement within said tube, the base of said head being recessed to form a peripheral cutting edge co-operating with the cutting edge of said tube during the longitudinal movement of the cutting rod to produce a shearing effect.

3. A device adapted for obtaining specimens of sub-cutaneous tissues comprising a non-slotted tube having a cutting edge, a pointed piercing member capable of longitudinal movement within and removable from said tube, the pointed end of said piercing member being extendible beyond the end of said tube, and a cutting rod capable of longitudinal movement within and removable from said tube, said cutting rod having an extended conical head capable of extension beyond the extremity of said tube and capable of longitudinal movement within said tube, the base of said head being recessed to form a peripheral cutting edge cooperating with the cutting edge of said tube during the longitudinal movement of the cutting rod to produce a shearing effect and means carried by said piercing member capable of attachment to an electric circuit.

Signed at New York city in the county of New York and State of New York this 27th day of March, 1930.

WILLIAM JOSEPH HOFFMAN.